United States Patent [19]
Vidrine et al.

[11] Patent Number: 4,917,408
[45] Date of Patent: Apr. 17, 1990

[54] ADJUSTABLE BALL FITTING FOR FLUID LINES

[76] Inventors: Matthew Vidrine, 920 N. 1st St.; Robert Lucero, 351 W. Gum, both of Eunice, La. 70535

[21] Appl. No.: 314,225

[22] Filed: Feb. 21, 1989

Related U.S. Application Data

[63] Continuation of Ser. No. 103,669, Oct. 2, 1987, abandoned.

[51] Int. Cl.$^4$ .................. F16L 27/04; F16L 47/00
[52] U.S. Cl. .................... 285/261; 285/423; 285/915
[58] Field of Search ............ 285/261, 266, 271, 231, 285/230, 291, 915

[56] References Cited

U.S. PATENT DOCUMENTS

| | | | |
|---|---|---|---|
| 39,691 | 8/1863 | Ward | 285/291 X |
| 403,916 | 5/1889 | Collins | 285/261 X |
| 522,896 | 7/1894 | Henley | 285/231 |
| 1,087,006 | 2/1914 | Fitzsimons | 285/261 X |
| 1,099,220 | 6/1914 | Ward | 285/261 X |
| 1,179,594 | 4/1916 | Wood | 285/261 |
| 1,949,829 | 3/1934 | Ellis | 285/261 X |
| 2,564,938 | 8/1951 | Warren | 285/261 X |
| 2,770,476 | 11/1956 | Cleverly | 285/915 X |
| 3,431,370 | 3/1969 | Crosby | 285/261 X |
| 4,401,325 | 8/1983 | Tsuchiya et al. | 285/231 |
| 4,530,526 | 7/1985 | Dopyera et al. | 285/261 |

FOREIGN PATENT DOCUMENTS

| | | | |
|---|---|---|---|
| 2448426 | 4/1975 | Fed. Rep. of Germany | 285/261 |
| 1129134 | 1/1957 | France | 285/231 |
| 1220243 | 5/1960 | France | 285/271 |
| 1226904 | 8/1960 | France | 285/261 |
| 2339125 | 8/1977 | France | 285/261 |
| 779321 | 7/1957 | United Kingdom | 285/261 |

OTHER PUBLICATIONS

Alien Property Custodian, Ser. No. 293,149, Boissou, published May 25, 1943.

Primary Examiner—Thomas F. Callaghan
Attorney, Agent, or Firm—Pravel, Gambrell, Hewitt, Kimball & Krieger

[57] ABSTRACT

A pipe fitting for interconnecting two sections of pipe and comprising an interior male portion having a band of flexible material bonded to the outer surface, a female portion, and end of which is positioned over and slidably engaged over the elasomeric ring, to allow rotative movement of the female portion with respect to the male portion, so that an angle of deflection may be achieved between the first section of pipe and the second section of pipe engaged into the fitting. There is further provided means on the interior of the fitting for allowing unrestricted flow of fluid at least in a single direction through the fitting as the fitting is deviated through the range of angles in its use.

5 Claims, 3 Drawing Sheets

ADJUSTABLE BALL FITTING FOR FLUID LINES

This is a continuation of Ser. No. 103,669, filed 10/2/87, now abandoned.

BACKGROUND OF THE INVENTION

1. Field of the Invention

The apparatus of the present invention relates to fluid line fittings. More particularly, the present invention relates to an adjustable ball fitting positionable on a fluid line such as a sewer line, for allowing directional changes in the fluid line over a wide range angle.

2. General Background

In laying out fluid lines, such as common household sewer lines, in the present state of the art sewer lines constructed of a plastic pipe known as PVC, which are buried underground to comprise these lines. It is often times during the construction of a sewer line from the point of connection to the point of the main sewer, the PVC line undergoes several directional changes. At present, there is available four types of fittings, which are placed onto the end of a section of PVC line so that the line may continue before options being (a) a straight-fitting, (b) a 90° fitting, (c) a 45° angle fitting, and (d) a 22½° angle fitting. Although these types of fittings are useful, one can image the restrictive use that these fittings provide, in view of the fact that very seldom will a sewer line have to change direction at precisely the degree angle that these three types of fittings provide. Therefore, one problem that may be often encountered is that if the ditch housing the line has been previously dug, and the change in direction does not match precisely with one of these three types of fittings, then it may be required that the ditch be re-dug in order to suit the proper angular fitting available.

Therefore, there appears to be a need in the art for a fitting that would allow the sewer line to have the ability to change direction over a multitude of angles, not to be restricted to the three particular angles available.

The question of a pipe coupling which are angulated moveable with respect to one another, have been found in the following patents:

U.S. Pat. No. 39,691 issued to Ward, entitled "Pipe Coupling", relates to a pair of connected coupling members having a packing therebetween, in order to allow some flexibility in the coupling.

U.S. Pat. No. 3,291,508 issued to Kolthoff, Jr., relates to a flexible fluid joint utilizing rubber, and bonding the inner pipe section to an outer pipe section. The bonding of the pipe sections together result in a resilient or a flexible material such as synthetic or natural rubber, or plastic. This gasket intermediate the pipe sections may allow some flexibility in the connections of the pipe sections.

U.S. Pat. No. 4,194,769, issued to Bram, discloses a sealing element positioned within a socket cavity between an outer female socket portion of the pipe and around the male section, which would apparently allow some flexibility between the interior male section and the exterior female section of the pipe.

U.S. Pat. No. 3,884,510, issued to Bram, exhibits a sealing element which is a radially compressed elasomeric sealing element for locking a joint between two pipe elements whose axis have an angular deviation.

U.S. Pat. No. 4,033,613, also issued to Bram, relates to a device for locking the joint between a male and female pipe end members against forces which would tend to separate the pipe elements and would allow some flexibility between the inner and outer pipes.

U.S. Pat. No. 3,979,142, issued to Fujisawa, teaches a flexible pipe joint adapted to flexibly hold together end cubes of pipe made of rigid material having an elastic rubber body flexible holding the opposed end tubes an a spherical shell shaped reinforcing layer embedded into the plastic rubber body.

SUMMARY OF THE PRESENT INVENTION

The apparatus of the present invention solves the shortcomings in the art in a simple and straightforward manner. What is provided is a pipe fitting for interconnecting two sections of pipe and comprising an interior male portion having a ring of flexible elasomeric material bonded to the outer surface, a female portion, an end of which is positioned over and slidably engaged over the elasomeric ring, to allow rotative movement of the female portion with respect to the male portion, so that an angle of deflection may be achieved between the first section of pipe and the second section of pipe engaged into the fitting. There is further provided means on the interior of the fitting for allowing unrestricted flow of fluid in at least one direction through the fitting as the fitting is deviated through the range of angles in its use.

Therefore, it is a principal object of the present invention to provide a fitting which is adaptable between two sections of pipe for allowing deviation between the sections of pipe over a multitude of angles;

It is still a further object of the present invention to provide a fitting positionable between two section of pipe which allows the pipe to change direction over at least a 40° angular range; and it is still a further object of the present invention to provide a fitting which allows angular deviation of sections of pipe attached to both ends of the fitting, yet maintains a sealed fitting for the flow of fluids therethrough.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

The preferred embodiment of the apparatus of the present invention is illustrated by the number 10. Adjustable ball fitting 10 is a ball fitting of the type utilized in the underground layout of PVC sewer lines which would interconnect sections of PVC line, utilized particularly in the change of direction of the line during the layout of the line.

Figure 6:
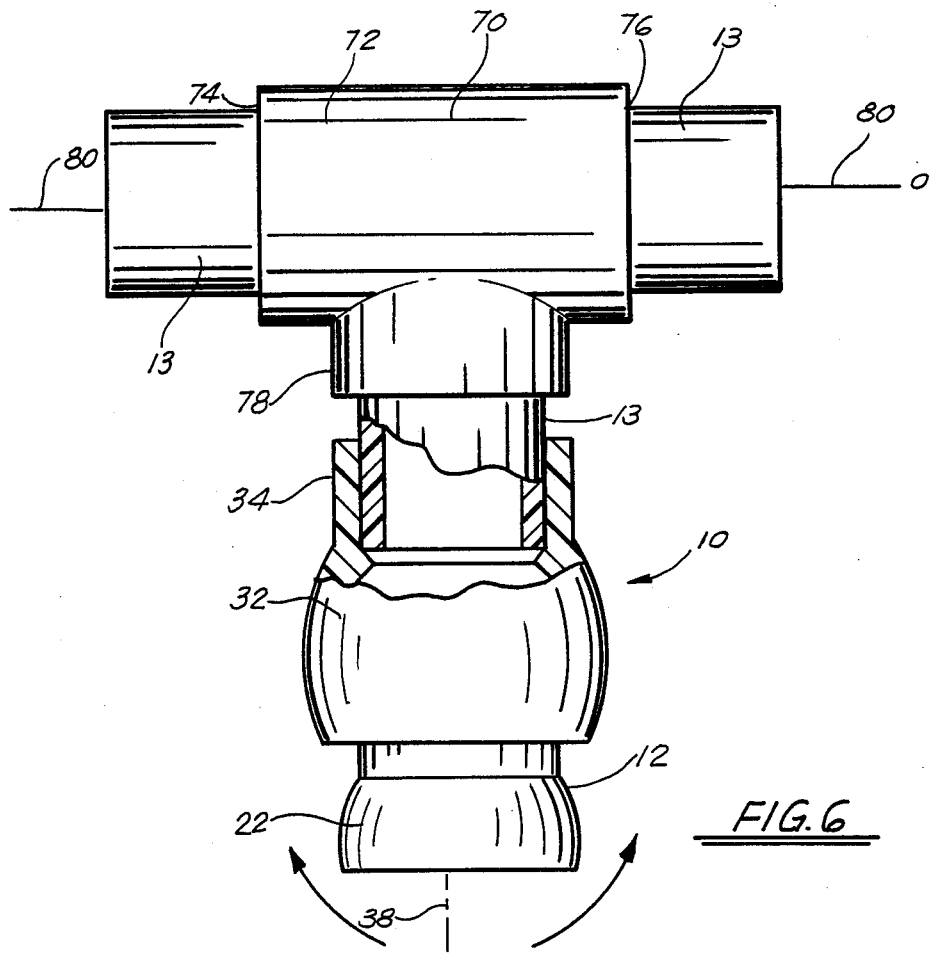
FIG. 6 illustrates a side partial cut-away view of the apparatus of the present invention affixed to a 90° pipe fitting.
Figure 7:
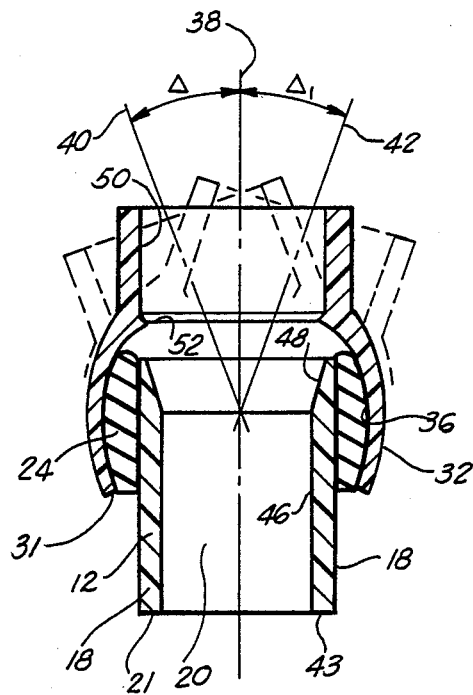
FIG. 7 illustrates a cross-sectional view of an alternate embodiment of the present invention.

As seen in the Figures, adjustable ball fitting 10 would comprise a first interior male portion 12 having a first end portion 14 and a second end portion 16, the end portion including an annular wall 18 with a fluid flow bore 20 therethrough. As seen in the Figures, first end portion 14 would have annular wall 18 filling into the female portion 30 of apparatus 10, and the second end portion 16 would include an expanded annular wall 22 for receiving the male end of a section of PVC pipe 13 (phantom view) during use of the fitting. For purpose of discussion, it should be understood that fittings of this type, as illustrated in FIGS. 1-6, whether they be of the present invention or of standard fittings, are always utilized to have female end portions for receiving a male section of PVC pipe 13, as seen in FIG. 6. FIG. 7, as will be discussed, is modified to engage a female end.

As seen further in the Figures, adjustable ball fitting 10 would further comprise an elasomeric ring member 24 which may be comprised of neoprene rubber, having an exterior traveling surface 26, and an interior surface 28, with elasomeric ring member 24 positioned over annular surface 18 of male member 14. For purposes of construction, the interior surface 28 of neoprene member 24 would be bonded via glue or the like to exterior annular surface 18 of male member 14 so that ring member 24 would be virtually immovable in relation to male member 14, as seen in FIG. 2.

Figure 1:
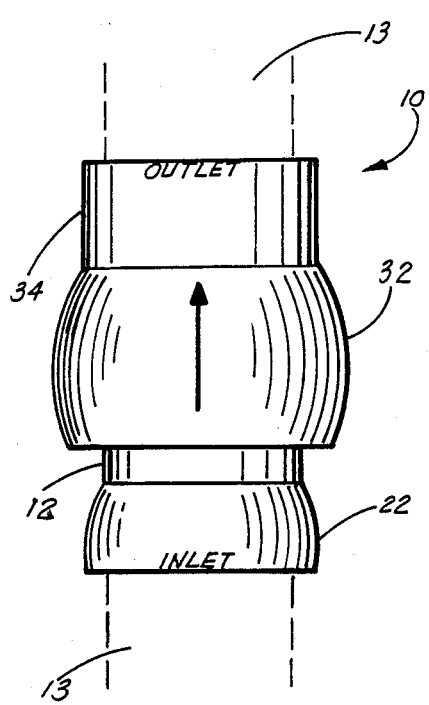
FIG. 1 illustrates a side view of the preferred embodiment of the apparatus of the present invention.

Further, adjustable ball fitting 10 is provided with a female end member 30, having a first expanded portion 32, and a straight second end portion 34, the second end portion 34 positionable over the second section of PVC pipe 13 as seen in phantom view in FIG. 1.

Figure 2:
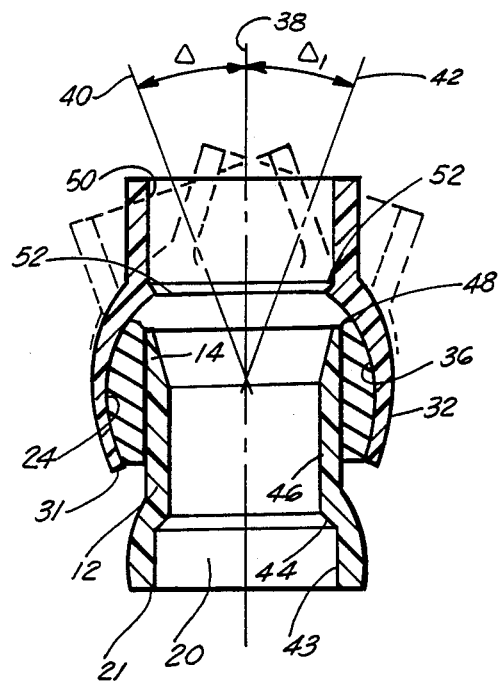
FIG. 2 illustrates a cross-sectional view of the preferred embodiment of the apparatus of the present invention.
Figure 3:
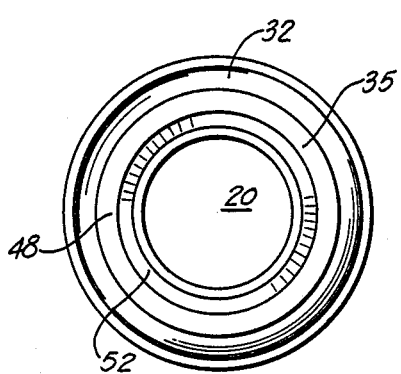
FIG. 3 illustrates the male end view of the preferred embodiment of the apparatus of the present invention.
Figure 4:
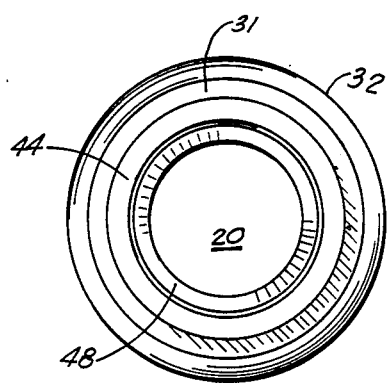
FIG. 4 illustrates the second end view of the preferred embodiment of the apparatus of the present invention.
Figure 5:
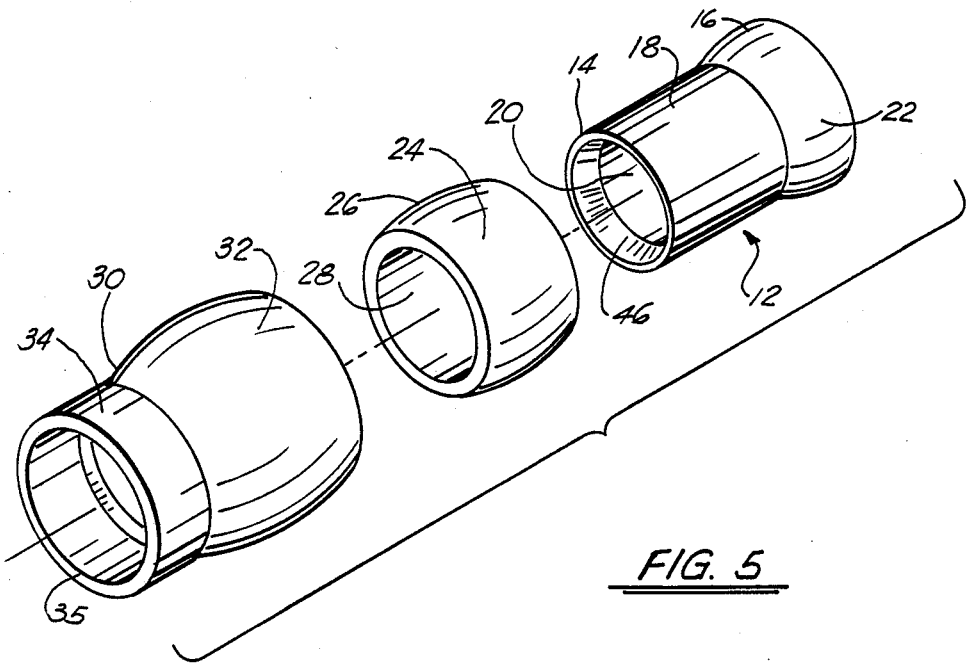
FIG. 5 illustrates an exploded view of the preferred embodiment of the apparatus of the present invention.

Expanded portion 32, as seen in FIG. 2, would be slidably engaged against the outer traveling surface 26 of elasomeric ring 24, and the interior surface 36 of expanded portion 32 would be of the same degree of curvature as traveling surface 26 of ring 24 so as to allow rotation of female portion 30 relative to the fixed position of elasomeric ring 24 as seen the Figures particularly in FIG. 2, yet maintain a fluid seal therebetween. This angle of rotation from the vertical represented by vertical line 38 is a minus 20° from the vertical as indicated line 40 and plus 20° as indicated by line 42, the total range of angulation being 40° in deviation.

As seen in the Figures, male portion 12, as stated earlier, would include a fluid flow bore 20, with the interior wall 46 of male portion 12 comprising a first portion 43 for receiving a section of PVC pipe 13 thereinto and angulated shoulder portion 44 for accommodating the end portion of pipe 13 and continuing with a vertical fluid flow bore wall 46 with the first end portion 14 of male portion 12 having a beveled wall 48, which serves as a means for assuring that the fluid flow through the adjustable ball fitting 10 despite the angle of the female portion 30 in relation to the male portion 12 is not restricted in the direction as illustrated in FIG. 1 by Arrow 15 and allows a continuous flow bore of the necessary size to allow flow therethrough, at least in that one direction.

Turning now to female portion 30, it would include an interior wall 50 on the first end portion 34 having also a beveled shoulder portion 52 for receiving the second section of PVC pipe 13 into the end portion 34 when the apparatus is in place. FIG. 2 illustrates the angles delta, and delta 1, through which rotation takes place between portions 12 and 30.

FIG. 6 illustrates utilization of apparatus 10 in conjunction with a typical "T" fitting 70 wherein the "T" fitting comprises a main body portion 72 having a first end 74 and a second female end 76 for accommodating the first and second sections of PVC pipe 13 into the ends 74 and 76 respectively. There is also included a third body member 78 integral attached to the annular wall of "T" portion 70 having a flow bore in fluid communication with the flow bore of the main body portion 70 for accommodating an addition section of PVC pipe 13 thereinto. However, for purposes of use of apparatus 10, hypothetically the teeing off of line 13 using "T" member 70 would allow a straight 90° angular deviation in the line under normal circumstances. However, in the event that the line was not a standard 90° turn, therefore apparatus 10 would be utilized to be positioned so that lower PVC section 13 would be inserted into the female end 34 of female section 32 and would allow therefore the deviation of male end portion 12 or the 40° angle from the vertical axis as represented by phantom line 38 in FIG. 6. Therefore, a third section of PVC would be secured into female end portion 22 of male portion 12, and would therefore allow a plus or minus degree change in direction from the 90° deviation of "T" fitting 70.

For purposes of further explanation, turning to FIG. 6, if one would utilize line 80 as being the 0° axis in a sewerage line between the sections of PVC pipe 13, then it is readily seen that with the utilization of apparatus 10 as seen in FIG. 6, the amount of total deviation from the 0° axis would be 110° which would include the 90° of the "T" fixture and the additional 20° rotation of the adjustable ball fitting 10. Therefore, in combination with the fixed fittings presently on the market, one could achieve a 0 direction deviation, a plus or minus 20° from the straight line fixture, and any combination of deviations from the 22½, 45, and 90 degrees, which would be plus or minus 20° in combination with apparatus 10.

For purposes of construction, it is foreseen that apparatus 10 would be constructed utilizing the method of having a first male section 12 of the apparatus, with the standard end portion 22 for receiving the end portion of a PVC section 13, and the second straight wall section 18 having an interior surface 46, the first step would be forming the beveled edge 48 along the interior wall 46, providing a elasomeric ring member 24 constructed of preferably neoprene rubber, having a flow bore 28 therethrough, providing the second female portion 30, heating a portion of the wall portion of section 30 and allowing the wall portion to expand to a point so that it may slidably accommodate the outer traveling surface 26 of elasomeric ring 24, next placing elasomeric ring 24 within the expanded portion 32 of section 30, applying a layer of glue to the outer surface of straight wall portions 18 of section 12, inserting the straight wall portion 18 of section 12 into the interior of ring 24, to a point that the end portion 14 of portion 12 is substantially flush with the end of elasomeric ring 24, and allowing the glue to harden so that ring 24 is in fixed position around male portion 12, yet outer ring 32 is allowed to rotate relative to their outer surface 26 of ring member 20, for allowing the relative adjustability of outer ring 30 in relation to the fixed interior section 12.

FIG. 7 illustrates a cross-sectional view of a modified version of apparatus 10 that is illustrated in FIGS. 1-6. As seen in FIG. 7, apparatus 10 would for the most part comprise the same basic elements, i.e., female section 30 slidably mounted upon elasomeric ring 24 which would be secured around the annular wall 18 of male portion 12, so that female portion 30 rotates relative to the fixed position of elasomeric ring 24. However, unlike the preferred embodiment, male portion 12 has been modified so that the end portion 16 continues to have a straight wall 18 thus eliminating the expanded wall 22 as seen in the preferred embodiment. Therefore, portion 16 rather than accommodating a male end of a pipe into bore 20 would be able to slidably engage into a female portion of a coupling 70, and therefore eliminate the need for a section of pipe 13 intermediate thereof. Therefore, this particular embodiment may be directly engaged into coupling and the apparatus would be fixedly attached so that it could be rotated to the various degrees as required. This direct fixture to a coupling would facilitate shifting of the sewer line to various angles from the point of coupling and would eliminate any need for other angular fixtures other than the "T" coupling 70 as seen in FIG. 6.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An adjustable PVC ball fitting apparatus for connecting two straight, cylindrical sections of PVC pipe, the apparatus being positionable in a fluid line for providing angulated flow of fluid through the line, the apparatus comprising:
    (a) a first, unitary body portion having first and second ends, an annular wall, and having a beveled edge adjacent the first end of the first, unitary body portion, the bevel being formed by increasing the inner diameter of the first, unitary body portion from a point intermediate the first and second ends to a point adjacent the first end, a portion of the annular wall adjacent the second end of the first, unitary body portion having means for slidingly receiving a straight, cylindrical section of PVC pipe;
    (b) a second, unitary body portion including an annular wall and first and second ends, a portion of the annular wall adjacent the first end of the second, unitary body portion having means for slidingly receiving a straight, cylindrical section of PVC pipe and having a substantially ball-shaped portion adjacent the second end thereof;
    (c) a unitary resilient ring member, made of an elastomeric material, disposed within the substantially ball-shaped portion of the second, unitary body portion, the ring member having a substantially ball-shaped exterior travelling surface having a size and shape substantially equal to the inner surface of the substantially ball-shaped portion of the second, unitary body portion for slidingly engaging the interior surface of the substantially ball-shaped portion of the second, unitary body portion, the ring member also having a substantially cylindrical inner surface having a diameter substantially equal to the outside diameter of the first, unitary body portion adjacent the first end of the first, unitary body portion, the first end of the first, unitary body portion being disposed in the ring member; and
    (d) a bonding compound fixedly engaging the interior surface of the ring member to the exterior surface of the first, unitary body portion, wherein the elastomeric ring member is insertable into and removable from the substantially ball-shaped portion of the second, unitary body portion before the ring member is fixedly engaged to the first, unitary body portion, but after the elastomeric ring member is fixedly engaged to the first, unitary body portion, the ring member is not removable from the substantially ball-shaped portion of the second, unitary body portion, the resilient ring member being slidably movable in relation to the second, unitary body portion, so that the angle of flow within the line can be adjusted, yet preventing leakage between the first and the second body portions.

2. The apparatus of claim 1, wherein the second body portion includes an angulated shoulder portion which aligns with the beveled edge of the first, unitary body portion for providing continuous unobstructed flow of fluid through the first and second unitary body portions.

3. The apparatus of claim 1, wherein the maximum angle of adjustment of flow through the apparatus is 20°.

4. The apparatus of claim 1, wherein the second end of the first, unitary body portion is shaped to be received by a bore of a coupling means.

5. The apparatus of claim 1, wherein the means for slidingly receiving a straight, cylindrical section of PVC pipe comprises a substantially cylindrical inner surface having a diameter substantially equal to the outside diameter of a section of PVC pipe and terminating in a beveled edge intermediate the first and second ends of the unitary body portion.

* * * * *